(12) United States Patent
Harris

(10) Patent No.: US 7,243,141 B2
(45) Date of Patent: Jul. 10, 2007

(54) NETWORK CONFIGURATION EVALUATION

(75) Inventor: Adam Pierce Harris, San Diego, CA (US)

(73) Assignee: Sony Computer Entertainment America, Inc., Foster City, CA (US)

( * ) Notice: Subject to any disclaimer, the term of this patent is extended or adjusted under 35 U.S.C. 154(b) by 781 days.

(21) Appl. No.: 10/295,542

(22) Filed: Nov. 15, 2002

(65) Prior Publication Data

US 2003/0212772 A1 Nov. 13, 2003

Related U.S. Application Data

(63) Continuation-in-part of application No. 10/215,899, filed on Aug. 8, 2002.

(60) Provisional application No. 60/380,396, filed on May 13, 2002.

(51) Int. Cl.
*G06F 15/177* (2006.01)
*G06F 15/16* (2006.01)
*A63F 9/24* (2006.01)

(52) U.S. Cl. .................. 709/220; 709/245; 463/40

(58) Field of Classification Search ........ 709/201–203, 709/245, 220, 246; 463/36, 37, 38, 39, 40
See application file for complete search history.

(56) References Cited

U.S. PATENT DOCUMENTS

| | | | | |
|---|---|---|---|---|
| 5,636,216 | A * | 6/1997 | Fox et al. ................ | 370/402 |
| 5,793,763 | A * | 8/1998 | Mayes et al. ............ | 370/389 |
| 6,058,431 | A * | 5/2000 | Srisuresh et al. ......... | 709/245 |
| 6,128,623 | A | 10/2000 | Mattis et al. | |
| 6,128,624 | A | 10/2000 | Papierniak et al. | |
| 6,128,627 | A | 10/2000 | Mattis et al. | |
| 6,151,584 | A | 11/2000 | Papierniak et al. | |
| 6,151,601 | A * | 11/2000 | Papierniak et al. ....... | 707/10 |
| 6,208,649 | B1 | 3/2001 | Kloth | |
| 6,209,003 | B1 | 3/2001 | Mattis et al. | |
| 6,212,565 | B1 | 4/2001 | Gupta | |

(Continued)

FOREIGN PATENT DOCUMENTS

WO   WO99/35799   7/1999

(Continued)

OTHER PUBLICATIONS

NAT and Network Games, p. 1-5, Entitled: Just the FAQs, Ma'am, http://www.u.arizona.edu/~trw/games/nat.htm, Oct. 23, 2002.

(Continued)

*Primary Examiner*—Saleh Najjar
*Assistant Examiner*—V. Korobov
(74) *Attorney, Agent, or Firm*—Frommer Lawrence & Haug LLP; William S. Frommer; Thomas F. Presson

(57) ABSTRACT

Methods and apparatus for network configuration evaluation. In one implementation, a method of evaluating a network configuration includes: receiving an address message at a configuration server from a client system through a network, where the address message includes first address information and second address information for the client system; extracting the first address information and the second address information from the address message at the configuration server; and evaluating the address information at the configuration server including comparing the first address information and the second address information.

35 Claims, 16 Drawing Sheets

U.S. PATENT DOCUMENTS

| | | | |
|---|---|---|---|
| 6,289,358 B1 | 9/2001 | Mattis et al. | |
| 6,292,880 B1 | 9/2001 | Mattis et al. | |
| 6,333,931 B1 | 12/2001 | LaPier et al. | |
| 6,353,891 B1 | 3/2002 | Borella et al. | |
| 6,393,488 B1 * | 5/2002 | Araujo | 709/245 |
| 6,535,511 B1 * | 3/2003 | Rao | 370/392 |
| 6,581,108 B1 * | 6/2003 | Denison et al. | 709/245 |
| 6,636,898 B1 * | 10/2003 | Ludovici et al. | 709/250 |
| 7,107,348 B2 * | 9/2006 | Shimada et al. | 709/229 |
| 7,155,518 B2 * | 12/2006 | Forslow | 709/227 |
| 2002/0016826 A1 | 2/2002 | Johansson et al. | |
| 2003/0055978 A1 | 3/2003 | Collins | |

FOREIGN PATENT DOCUMENTS

| | | |
|---|---|---|
| WO | WO 01/97485 A2 | 12/2001 |
| WO | WO02/03217 | 1/2002 |
| WO | WO 02/23822 A1 | 3/2002 |

OTHER PUBLICATIONS

BroadbandReports.com, How to hookup your console to the net—section all, pp. 1 to 22, http://www.dslreports.com/faq/onlinegaming/all, Oct. 22, 2002.

NAT or Not; Do I use NAT?, pp. 1 of 3, http://www.u.arizona.edu/~trw/games/nat_or_not_php, Oct. 23, 2002.

Home Toys Article, HAI Omni Solution, UPnP NAT Traversal FAQ, pp. 1 to 4, http://hometoys.com/htinews/aug01/articles/microsoft/upnp.htm, Nov. 11, 2002.

InternetGatewayDevice: 1 Device Template Version 1.01, Copyright 1999-2001 Microsoft Corporation, 16 pgs.

STUN—Simple Traversal of UDP Thrugh NATs, J. Rosenberg et al. pp. 1-29, Copyright The Internet Society, Mar. 1, 2002.

Traveral Using Relay NAT (TURN), Rosenberg, Weinberger, Huitema, Mahy, Nov. 14, 2001, pp. 1 to 17.

* cited by examiner

NETWORK CONFIGURATION EVALUATION

RELATED APPLICATIONS

This application claims the benefit of U.S. Provisional Application No. 60/380,396 filed May 13, 2002, the disclosure of which is incorporated herein by reference, and is a continuation-in-part of U.S. patent application Ser. No. 10/215,899, filed Aug. 8, 2002, the disclosure of which is incorporated herein by reference.

BACKGROUND

One typical type of NAT server (network address translation server) acts as a gateway between a local network and an external network, such as the Internet. This NAT server is a network device that allows one or more machines (e.g., computers) in the local network to share one public or external network address, such as an Internet address. The NAT server maintains a set of unique local or internal network addresses for the machines in the local network. Accordingly, each machine in the local network has a local network address and a public network address. For communication between the local network and the external network, the NAT server translates back and forth between the public network address and the local network addresses for each of the machines. Typically this network address translation is transparent to the individual machines within the local network and so the machines are not aware of the public address used by the NAT server.

SUMMARY

The present disclosure provides methods and apparatus for network configuration evaluation. In one implementation, a method of evaluating a network configuration includes: receiving an address message at a configuration server from a client system through a network, where the address message includes first address information and second address information for the client system; extracting the first address information and the second address information from the address message at the configuration server; and evaluating the address information at the configuration server including comparing the first address information and the second address information.

DETAILED DESCRIPTION

The present invention provides methods and apparatus for network configuration evaluation. The present invention allows a configuration server to assess the network configuration of a client system connected to a network including determining whether a NAT device (network address translation device) is between the configuration server and the client system. As described below, in one implementation, the configuration server analyzes an address provided by the client system in an address message and an address of the source of the address message as received at the configuration server to assess the network configuration.

The description below is divided into two sections. Section 1 describes network communication between two client systems. Section 2 describes evaluating network configuration using the network architecture described in section 1 as one example, among others.

Section 1—Communication

This section describes network communication between two client systems.

Figure 1:
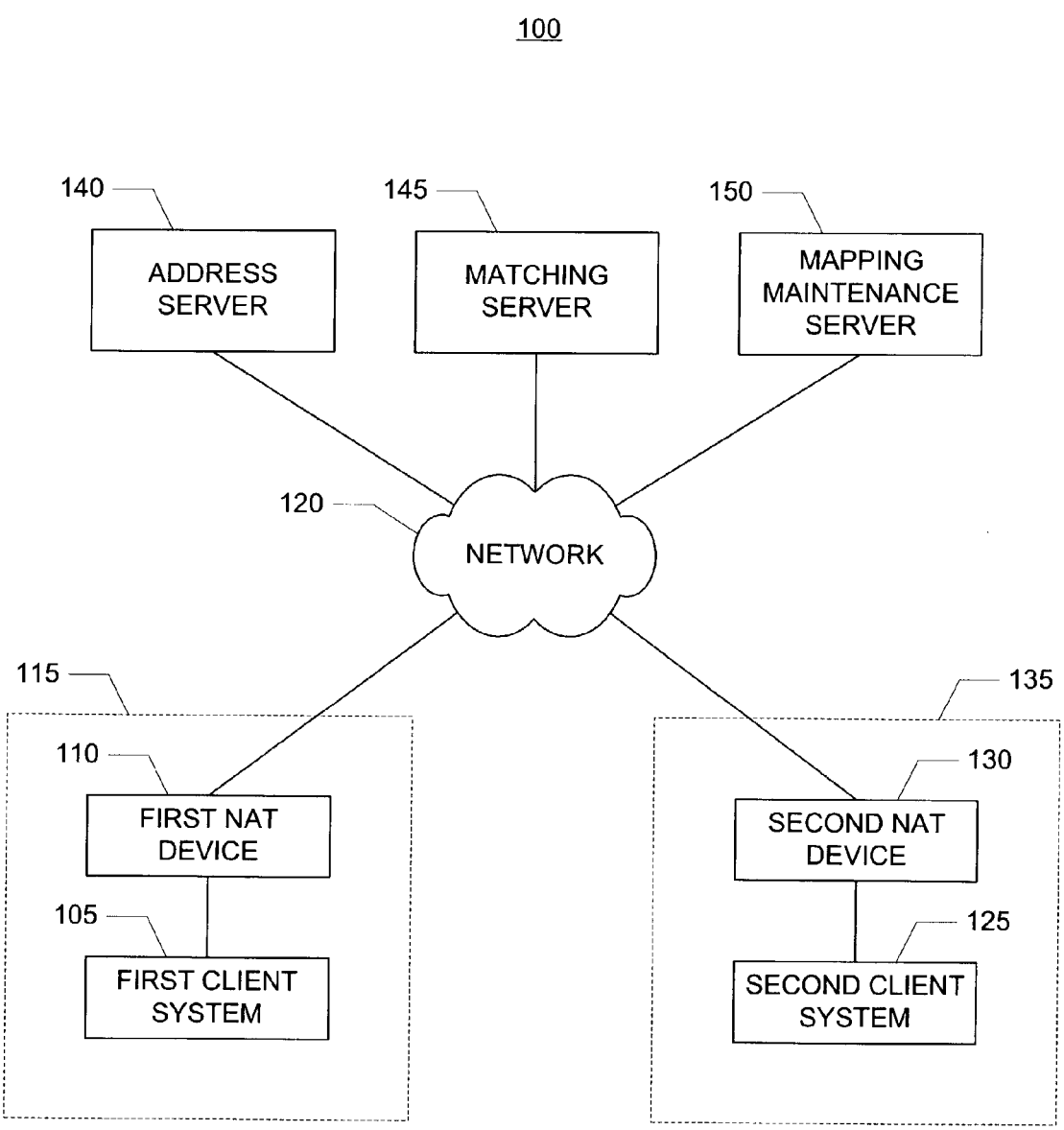
FIG. 1 shows a network system architecture.

FIG. 1 shows a network system architecture 100. A first client system 105 is connected to a first NAT device (network address translation device) 110, forming a first local or internal network 115. The first client system 105 is a network-enabled system, such as a video game console system including a network adapter or a computer system. As a video game console system, the first client system 105 includes hardware and/or software providing video game functionality and hardware and/or software providing network communication as described below. In one implementation, the first client system 105 is a "Playstation 2"™ game console by Sony Computer Entertainment Inc.™ The first NAT device 110 is a typical NAT box or NAT server, or alternatively is a type of proxy server or part of a gateway, router, or firewall. One or more additional systems or network devices, such as a computer, may also be connected to the first NAT device 110 and be within the first local network 115. Each system in the first local network 115 has a local network address assigned and maintained by the first NAT device 110. In one implementation, a local network address in the first local network 115 includes an address number and a port number, such as according to UDP/IP (e.g., where the address number is an IP address). In an alternative implementation, the first local network 115 uses a different communication protocol and so the local network address includes different information to identify a system.

The first NAT device 110 is connected to an external or public network 120, such as the Internet. Each addressable system or device connected to the external network 120 has a public network address. A "public" network address is used on the external network 120 and "local" network addresses are used within local networks, such as the first local network 115. In one implementation, a public network address includes an address number and a port number, such as according to UDP/IP. In an alternative implementation, the external network 120 uses a different communication protocol and so the public network address includes different information to identify a system. In one implementation, the local network addresses of the first local network 115 are not compatible with the external network 120 (e.g., the local network addresses are not recognizable in the communication protocol of the external network 120).

The first NAT device 110 has a public network address. The first client system 105 is indirectly connected to the external network 120 through the first NAT device 110 and does not have a public network address. The first client system 105 shares the public network address of the first NAT device 110 with other systems in the first local network 115 (if any are present). The first NAT device 110 assigns a local network address to each system in the first local network 115. The first NAT device 110 translates between the public network address and local network addresses to route data between the external network 120 and the first local network 115. In an alternative implementation, the first NAT device 116 has a two or more public network addresses to share among systems in the first local network 115.

In one implementation, the first NAT device 110 maps port numbers to systems in the first local network 115, such as by using a PAT technique (Port Address Translation). The first NAT device 110 assigns a port number to a local system in the first local network 115 when the local system sends data to a destination on the external network 120. The first NAT device 110 stores the port number as a port mapping between the port number and the local system. The first NAT device 110 assigns and stores a single port number for all outgoing data from a single local system. The first NAT device 110 includes the assigned port number with the outgoing data and so the recipient can use the port number when responding. The first NAT device 110 determines which system in the first local network 115 is the intended recipient of incoming data by comparing the port number attached to the incoming data with the port mappings stored within the first NAT device 110.

The first NAT device 110 establishes and adjusts the port mappings dynamically according to data sent and received using the mapping. If the first NAT device 110 does not receive data from a local system or from the external network 120 including a port number for a period of time, the first NAT device 110 releases the port mapping for that port number (a "timeout"). As described below, the first client system 105 can prevent this timeout by periodically sending messages out to the external network 120.

In one implementation, the first NAT device 110 screens incoming data (e.g., for security reasons) by comparing the network address of the sender of the incoming data with addresses of recipients of data sent by the local system indicated by the port number. When the first NAT device 110 sends data from a local system to a recipient on the external network 120, the first NAT device 110 records the destination address along with the port mapping for the local system. The first NAT device 110 does not forward incoming data to a local system on the first local network 115 if the local system has not already sent data to a recipient at the same network address as that of the incoming data. The first NAT device 110 compares the network address of the sender of incoming data with the recorded destination address(es) of outgoing data using the port included with the incoming data. As described above, the first NAT device 110 records destination addresses along with port mappings, so the first NAT device 110 can use a port number as an index to find destination addresses to which data has been sent by a local system. If there is not a match, the first NAT device 110 does not forward the incoming data into the first local network 115. As described below, the first client system 105 uses this security functionality to "approve" a system on the external network 120 by sending data to that system and so causes the first NAT device 110 to allow data from that approved system into the first local network 115.

For example, when the first client system 105 sends data to a recipient on the external network 120 the first NAT device maps a port number to the first client system 105. The first NAT device 110 includes the public network address for the first NAT device 110 and the mapped port number for the first client system 105 with the outgoing data. The first NAT device 110 also records the address of the recipient. When the first NAT device 110 receives data including that port number, the first NAT device 110 compares the address of the sender with the recorded address of the destination for the previously sent outgoing data. If the addresses match, the first NAT device 110 forwards the data to the first client system 105 using the local network address of the first client system 105.

A second client system 125 is connected to a second NAT device 130, forming a second local network 135. Similar to the first client system 105, the second client system 125 is a network-enabled system, such as a video game console system including a network adapter. Similar to the first NAT device 110, the second NAT device 130 is a typical NAT box or NAT server, or alternatively is a type of proxy server or part of a gateway or router. The second client system 125 and the second NAT device 130 operate similarly to the first client system 105 and the first NAT device 110, respectively (e.g., in terms of port mapping and screening incoming data). One or more additional network devices may also be connected to the second NAT device 130 and be within the second local network 135. Each system or device in the second local network 135 has a local network address assigned and maintained by the second NAT device 130, similar to the first local network 115. In one implementation, the first local network 115 and the second local network 135 are the same type of network and so use the same communication protocol, however, in alternative implementations, the local networks 115, 135 can be different types.

Similar to the first NAT device 110, the second NAT device 130 is connected to the external network 120. Accordingly, the second client system 125 is indirectly connected to the external network 120 through the second NAT device 130. The NAT devices 110, 130 can send data to each other through the external network 120 according to the protocols of the external network 120.

Three server systems are connected to the external network 120 as well: an address server 140, a matching server 145, and a mapping maintenance server 150. Each of the server systems 140, 145, 150 is a network server system, such as a computer system or a mainframe system. Alternatively, some or all of the server systems 140, 145, 150 are included within a single system connected to the external network 120. Each of the server systems 140, 145, 150 has a respective network address on the external network 135. These server network addresses are known to the client systems 105, 125. The address server 140 assists the client systems 105, 125 with address discovery. The matching server 145 assists the client systems 105, 125 with address sharing. The mapping maintenance server 150 assists the client systems 105, 125 with maintaining the address mapping of the NAT devices 110, 130, respectively. In an alternative implementation, the maintenance mapping server is omitted.

Figure 2:
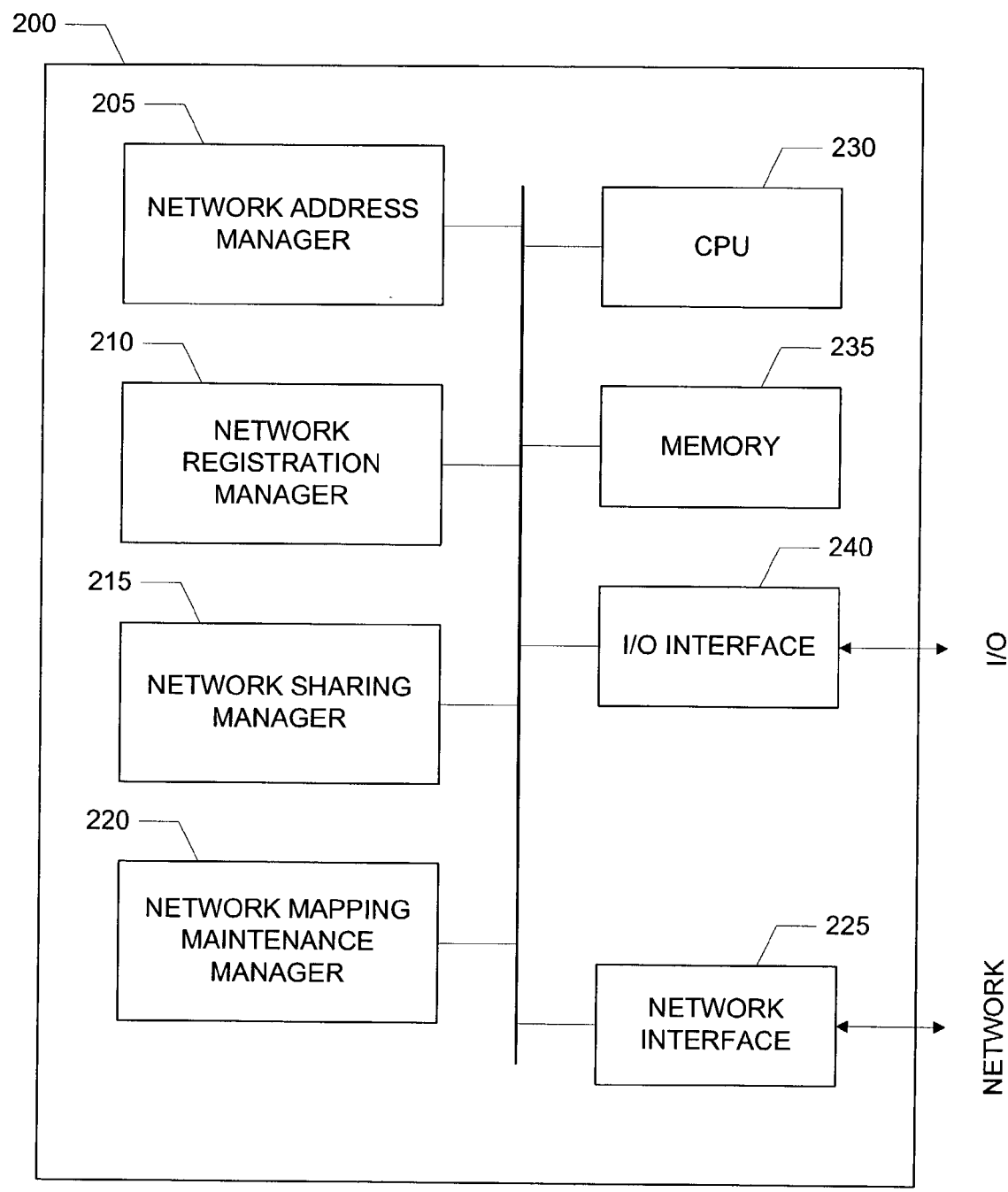
FIG. 2 is a block diagram of one implementation of a client system.

FIG. 2 is a block diagram of one implementation of a client system 200, such as first client system 105 in FIG. 1. The client system 200 includes four managers: a network address manager 205, a network registration manager 210, a network sharing manager 215, and a network mapping maintenance manager 220. Each of the managers 205, 210, 215, 220 is implemented as a software component of the client system 200. Alternatively, some or all of one or more of the mangers 205, 210, 215, 220 is implemented in hardware. The network address manager 205 controls communication between the client system 200 and the address server 140 to discover a public network address associated with the client system 200 by a connected NAT device, such as the first NAT device 10. The network registration manager 210 controls communication between the client system 200 and the matching server 145 to register the client system 200 with the matching server 145. The network sharing manager 215 controls communication with the matching server 145 to determine the public and local network addresses of another client system that has requested communication with the client system 200. The mapping maintenance manger 220 controls communication with the mapping maintenance server 150 to prevent the NAT device connected to the client system 200 from timing out the mapping established for the client system 200. In an alternative implementation, the client system 200 does not include a mapping maintenance manager 220. The client system 200 includes a network interface 225 for connecting to and communicating with the local network of the client system 200. The network interface 225 includes a network communication device, such as a network adapter or modem. The client system 200 also includes components for general operation, such as a CPU 230, memory 235, and an I/O interface 240. For a game console client system, the client system includes additional video, sound, and application specific software and/or hardware ("game components"). As noted above, in one implementation, a client system 200 is a "Playstation 2"™ by Sony Computer Entertainment Inc.™ including hardware and software for network communication as described herein.

Figure 3:
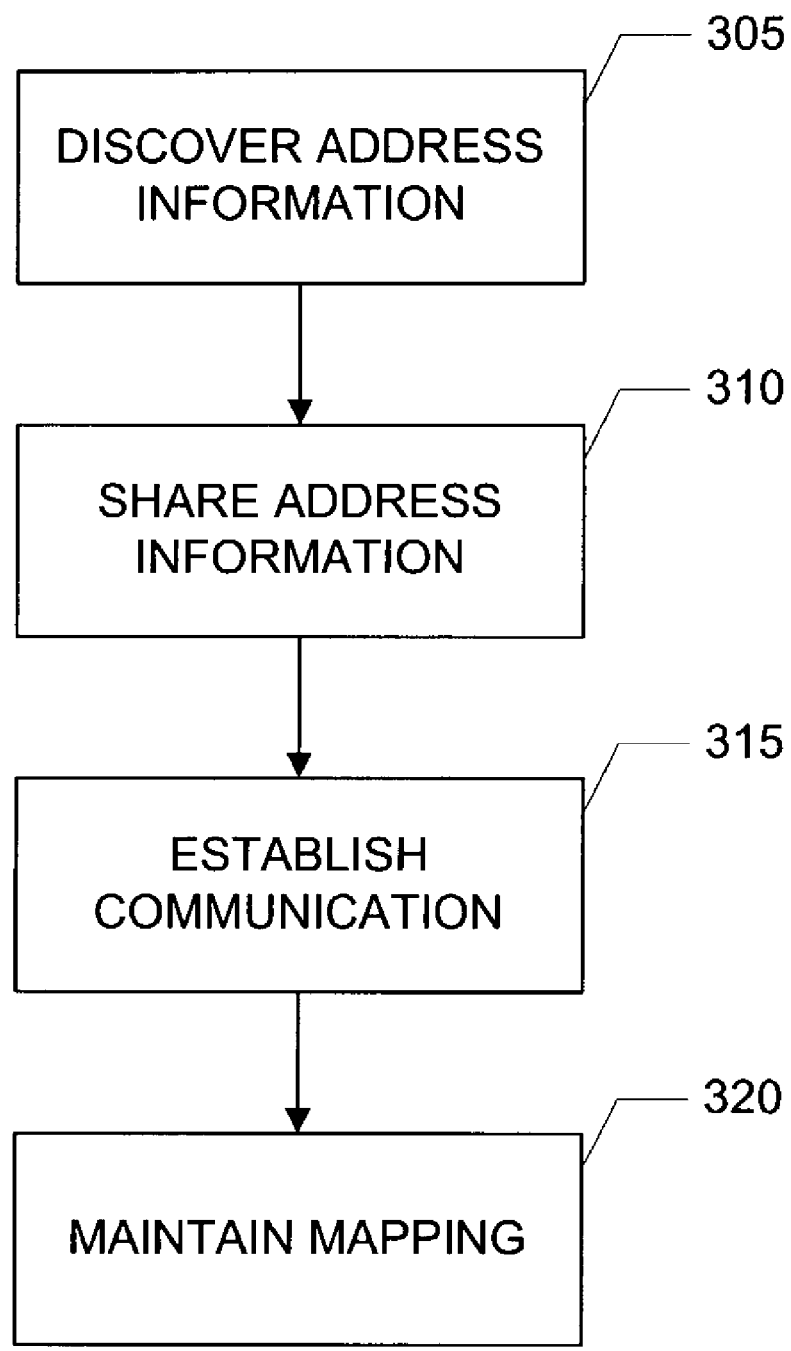
FIG. 3 is a flowchart of establishing and maintaining peer to peer network communication between two client systems.

FIG. 3 is a flowchart of establishing and maintaining peer to peer network communication between two client systems, such as the first client system 105 and the second client system 125 in FIG. 1. Each client system discovers its address information, block 305. A client system, such as the client systems 105, 125 in FIG. 1, has associated address information including a public network address and a local network address. As described below referring to FIG. 4, a client system discovers its public network address by communicating with the address server (recall the address server 140 in FIG. 1). A client system discovers its local network address by accessing locally stored information or by querying the corresponding NAT device. The client systems share their discovered address information with each other, block 310. As described below referring to FIG. 5, one or both of the client systems register with the matching server (recall the matching server 145 in FIG. 1). One of the client systems requests communication with the other registered client system and the matching server shares the address information between the client systems. The client systems establish communication with each other using the received address information, block 315. As described below referring to FIG. 6, each client system sends messages to the other client system using the shared address information so that the NAT devices recognize the incoming messages as "approved." While the client systems are communicating, the client systems maintain the mapping established by the corresponding NAT devices, block 320. As described below referring to FIG. 8, each client system periodically sends messages to the mapping maintenance server (recall the mapping maintenance server 150 in FIG. 1) so that the corresponding NAT device does not change or timeout the established port mapping for the client system. In an implementation that does not include a mapping maintenance server, the client systems do not maintain this mapping using a mapping maintenance server.

Figure 4:
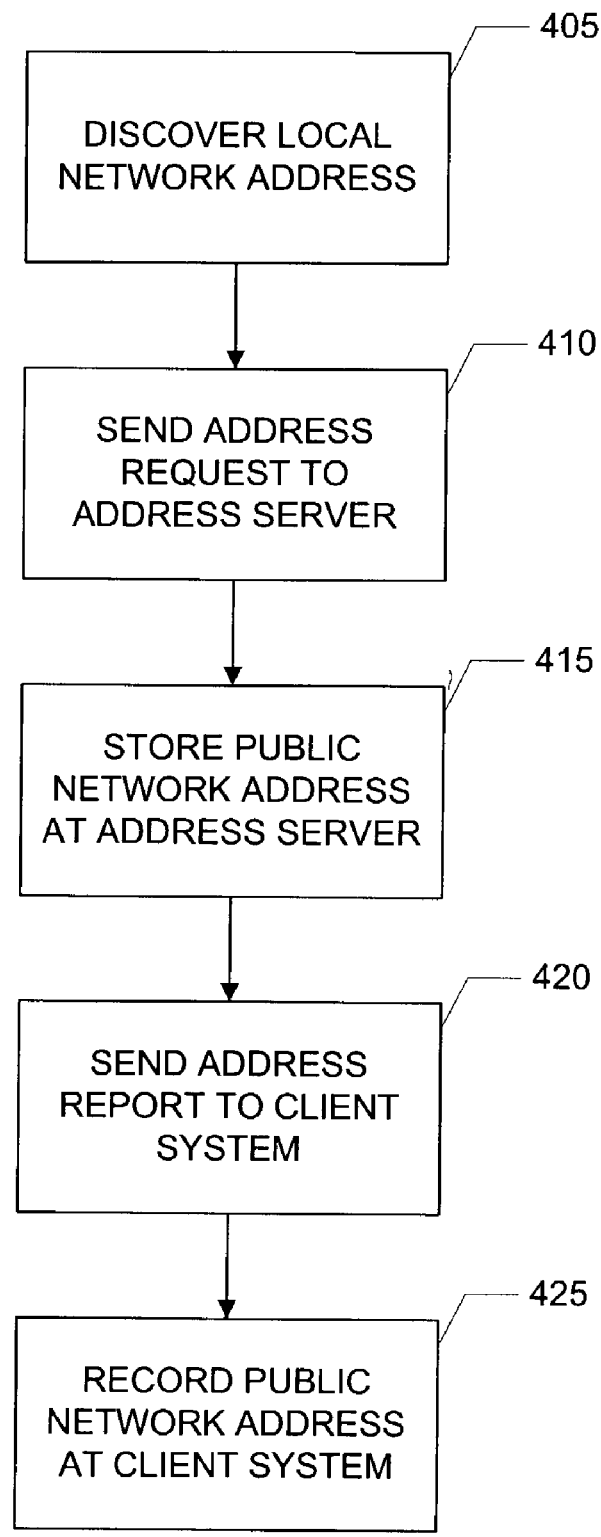
FIG. 4 is a flowchart of a client system discovering its local and public network addresses.

FIG. 4 is a flowchart of a client system discovering its local and public network addresses (recall block 305 of FIG. 3). As described above, the local network address is the network address of the client system in a local network and is assigned by a NAT device connected to the local network. The public network address is the network address on the external network shared by a NAT device among the systems in the local network connected to the NAT device. In one implementation, a local or public network address includes an address number and a port number. The client system uses its network address manager component to discover its public and local network addresses (recall network address manager 205 in FIG. 2).

A client system first discovers its local network address, block 405. In one implementation, a client system discovers its local network address by accessing local storage, such as by querying the network stack software used by the client system. The client system establishes the local port number when the client system initiates communication with the NAT device and so the client system is already aware of the port number. Alternatively, the client system can request the local network address from the corresponding NAT device. The client system sends an address request to the address server to discover the public network address, block 410. The client system sends the address request to the address server through the NAT device. As part of the NAT device's network address translation functionality, the NAT device adds the public network address to the address request, such as in header information for the address request. If the NAT device has not already assigned a port number to the client system, the NAT device assigns a port number and includes the port number in the public network address in the address request (e.g., in the UDP header). The address server extracts the public network address from the address request and stores the public network address, block 415. The public network address is located within the address request at a known location (e.g., within the header) so the address server can find the public network address in the address request. In an alternative implementation, the address server does not store the public network address or only stores the public network address temporarily. The address server returns the public network address to the client system by generating an address report and sending the address report to the client system, block 420. The address report includes the extracted public network address as part of the data or payload of the message as well as in the addressing portion of the message (e.g., in the header). The NAT device converts the public network address to the client system's local network address according to the port number and forwards the address report to the client system. For example, the NAT device accesses the port mapping for the client system according to the port number of the public network address and retrieves the local network address. The NAT device then replaces the public network address in the message's header information with the local network address. Accordingly, the NAT device modifies the header by removing the public network address, but does not modify the data portion of the message. The client system receives the address report and stores the included public network address, block 425. The client system has now discovered its local and public network addresses.

Figure 5:
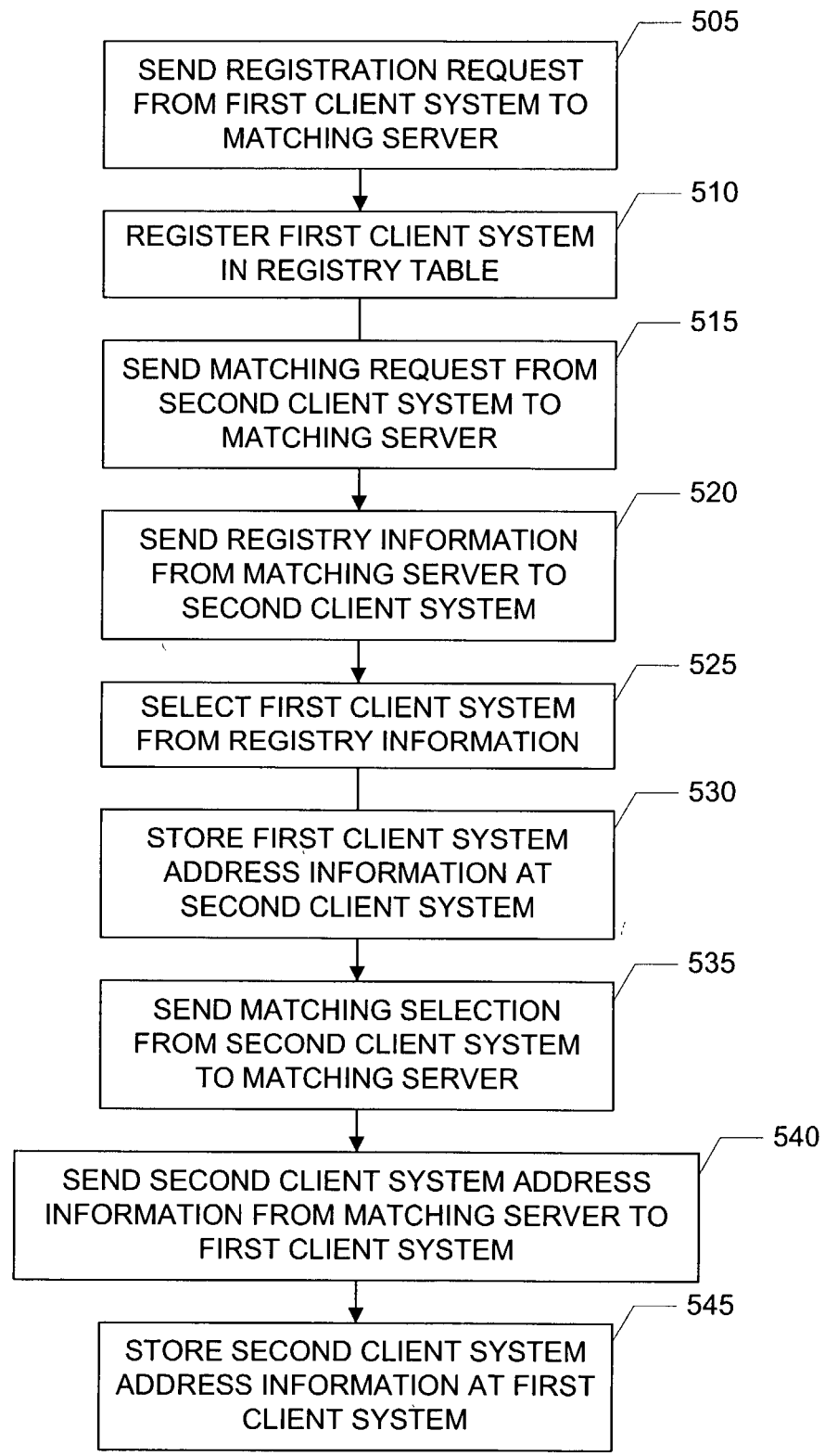
FIG. 5 is a flowchart of two client systems sharing their local and public network addresses.

FIG. 5 is a flowchart of two client systems sharing their local and public network addresses (recall block 310 of FIG. 3). A first client system registers with the matching server, block 505. A client system uses its network registration manager component to manage registering with the matching server (recall network registration manager 210 in FIG. 2). The first client system sends a registration request to the matching server. The registration request includes the first client system's discovered local and public network addresses. The registration request indicates to the matching server that the sending client system is available for communication using the provided address information. The matching server registers the first client system in a registry table, block 510. The matching server maintains a registry table with entries storing address information for registered systems. The matching server creates an entry in the registry table for the first client system and records the provided address information in the entry. The second client system sends a matching request to the matching server, block 515. A client system uses its network sharing manager component to manage obtaining the address information for another client system from the matching server (recall network sharing manager 215 in FIG. 2), both to select a registered client system and to receive address information after registering, as described below. The matching request indicates to the matching server that the second client system is requesting information to establish communication with another client system. The matching server sends registry information to the second client system, block 520. In one implementation, the matching server sends the registry table to the second client system. In another implementation, the matching server communicates with the second client system so that the second client system can access the registry table to identify a registered client system with which to communicate, such as by accepting search queries from the second client system. The second client system selects the first client system from among the registered client systems, block 525. The second client system stores the address information for the first client system, block 530. In one implementation, the registry information sent to the second client system includes address information for the registered client systems. In another implementation, the second client system separately requests the address information for the selected client system from the matching server. The second client system sends a matching selection to the matching server, block 535. The matching selection indicates with which of the registered client systems the second client system is to communicate (in this case, the first client system). The matching selection also includes the second client system's address information. In one implementation, the matching selection also serves as a request for the address of the first client system. The matching server sends the second client system's address information to the first client system as the selected client system, block 540. The first client system receives and records the second client system's address information, block 545. Each of the two client systems have now shared their address information with the other client system through the matching server.

Figure 6:
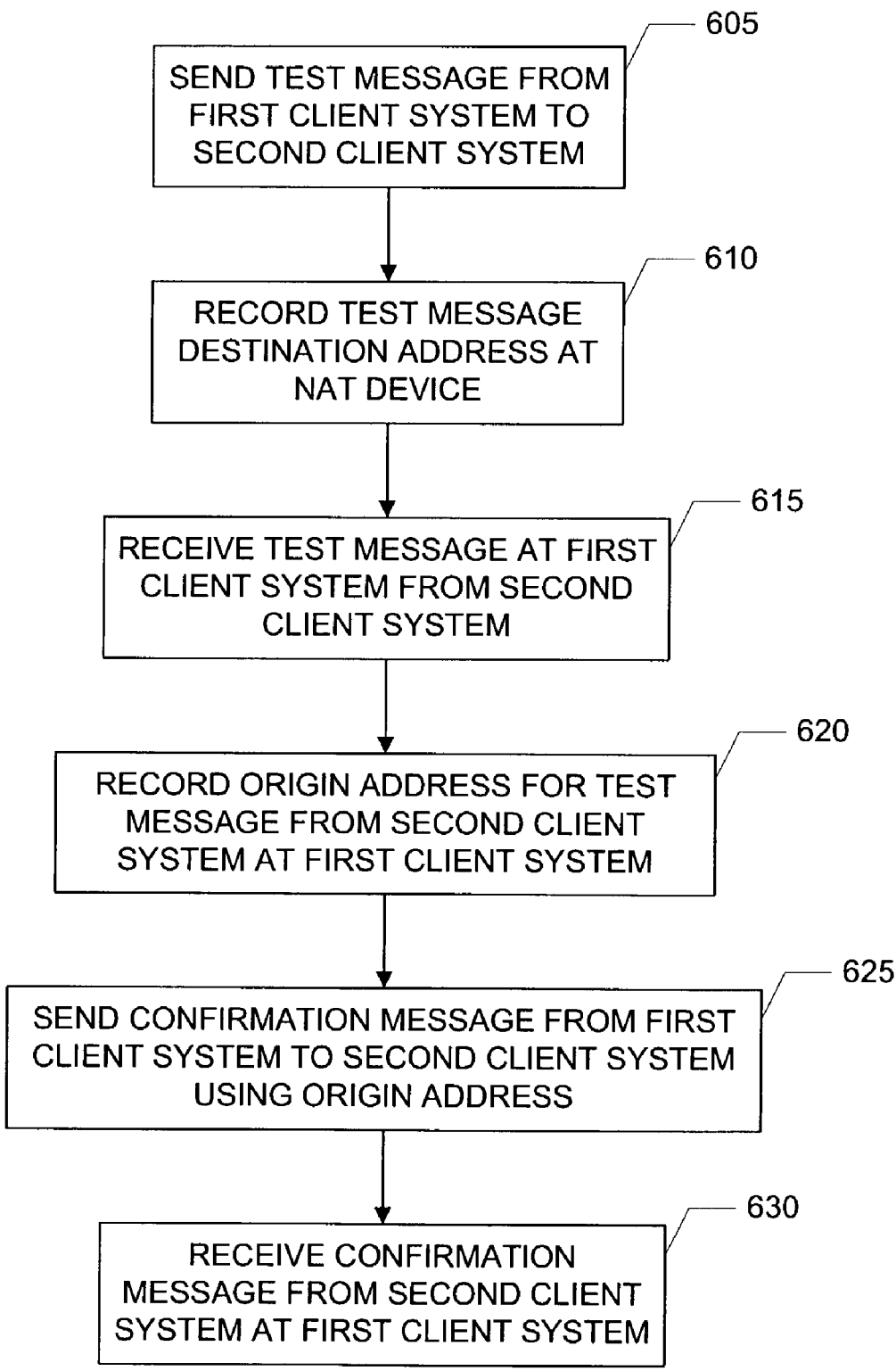
FIG. 6 is a flowchart of a first client system establishing communication with a second client system.

FIG. 6 is a flowchart of a first client system establishing communication with a second client system (recall block 315 of FIG. 3). The first client system sends one or more test messages to the second client system, block 605. The first client system sends some of the test messages to the second client system using the public network address for the second client system (outgoing public address test messages) and some of the test messages using the local network address for the second client system (outgoing local address test messages). As described above, the first client system received the public and local network addresses for the second client system when the two client systems shared address information (recall FIG. 5). In an implementation where the local network addresses of the second client system's local network are not compatible with the external network (e.g., the local network addresses are not recognizable under the communication protocol of the external network), the first client system does not send test messages using the local network address. The first client system continues to send test messages to the second client system until the first client system receives a confirmation message from the second client system in block 630, as described below.

The NAT device connected to the first client system records the destination addresses of the outgoing test messages, block 610. The NAT device connected to the first client system (e.g., the first NAT device 110 in FIG. 1) is a gateway between the local network of the first client system and the external network. Accordingly, the outgoing test messages pass through the NAT device. As described above, the NAT device screens incoming data and does not allow data to enter the NAT device's local network unless the local network destination of the incoming data has already attempted to communicate with the sender of the incoming data. The NAT device records the destination address of outgoing data from the systems on the local network as "approved" addresses for the sender of the outgoing data. The NAT device compares the origin address of the incoming data (i.e., the address of the sender) with recorded "approved" addresses for the intended recipient on the local network. The NAT device only forwards incoming data to the local recipient when the origin address matches one of the "approved" addresses for the local recipient.

Accordingly, the NAT device records the destination addresses of the outgoing test messages as "approved" addresses of systems with which the first client system is attempting to communicate. When the NAT device receives data for the first client system that is from the same address as the destination address of one of the first client system's outgoing test messages, the NAT device forwards the incoming data to the first client system. The first client system is sending test messages to addresses for the second client system, so the NAT device will forward data from the second client system to the first client system.

While the first client system is sending test messages to the second client system, the second client system is sending test messages to the first client system as well, as described below referring to FIG. 7. As described above for the first client system, the second client system sends outgoing public address test messages (and outgoing local address test messages if appropriate) using the address information for the first client system. The NAT device connected to the second client system (e.g., the second NAT device 130 in FIG. 1) records the destination addresses for the outgoing test messages and so will forward incoming data for the second client system received from the first client system.

The first client system receives a test message from the second client system, block 615. As described above, the NAT device connected to the first client system forwards an incoming test message from the second client system to the first client system because the NAT device matches the origin address of the incoming test message with a recorded "approved" address. The first client system records the origin address of the received test message, block 620. The first client system sends a confirmation message to the second client system using the recorded origin address, block 625. The outgoing confirmation message indicates to the second client system that the first client system has received a test message from the second client system. Similarly, the second client system receives a test message from the first client system and sends a confirmation message to the first client system using the origin address of that test message. The first client system receives a confirmation message from the second client system, block 630. When the first client system receives a confirmation message from the second client system, the first client system stops sending test messages to the second client system. The first client system has now established communication with the second client system. After the second client receives the confirmation message from the first client system, the second client system will have established communication with the first client system. The client systems have confirmed an address to which each system can send data and have that data successfully pass through the NAT device of the recipient system.

By first sending test messages addressed to the second client system so that the NAT device will forward messages from the second client system to the first client system, the first client system is "punching holes" in the security features of the NAT device. Accordingly, this technique is referred to as "hole punching." Using "hole punching" the first and second client systems can establish communication without altering the operation of the NAT devices.

Figure 7:
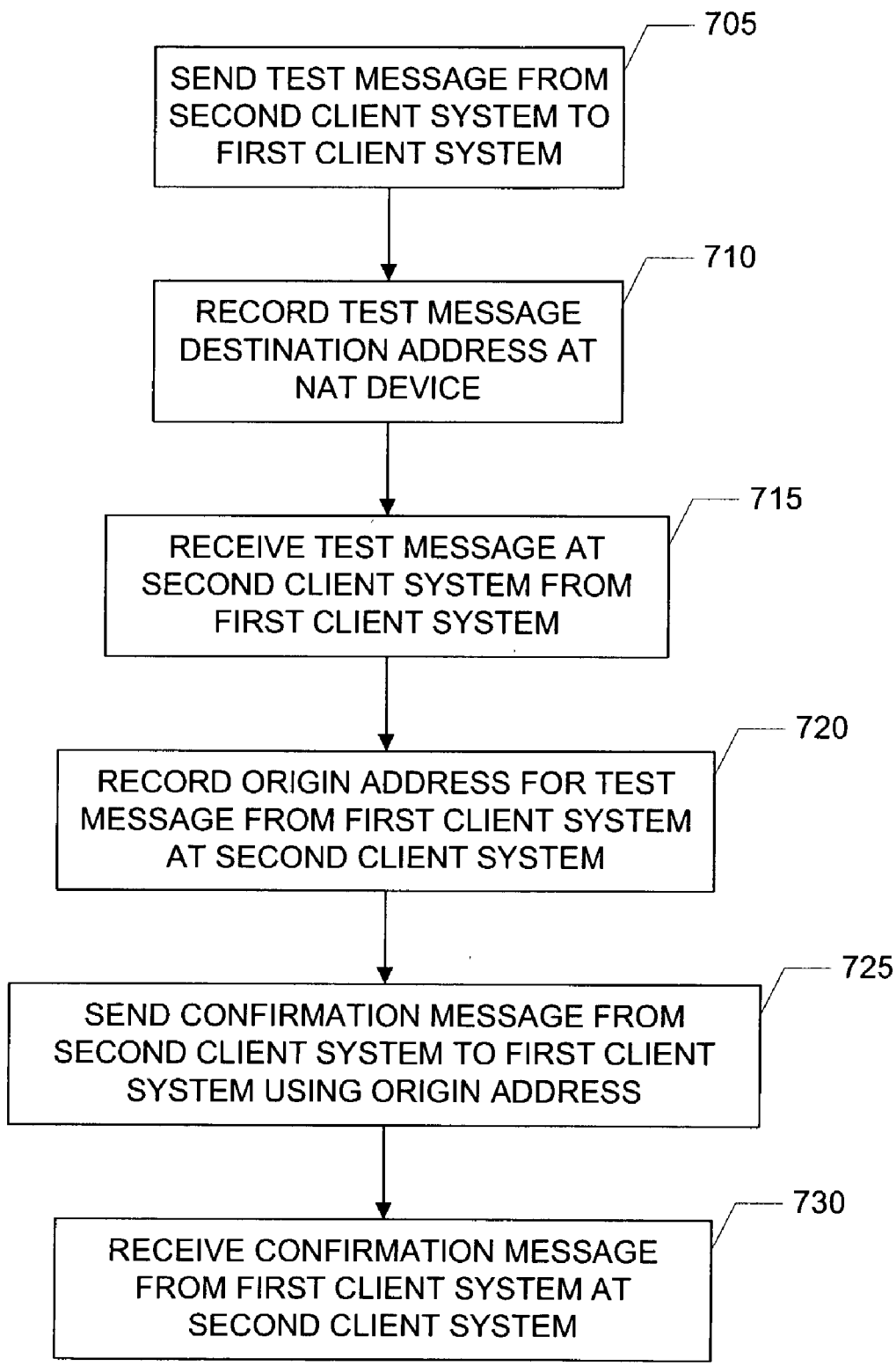
FIG. 7 is a flowchart of the second client system establishing communication with the first client system.

FIG. 7 is a flowchart of the second client system establishing communication with the first client system. The actions of FIG. 7 occur in conjunction with those described above referring to FIG. 6. The second client system sends test messages to the first client system using the address information received when the client systems shared address information, block 705. As noted above, the second client system sends outgoing public address test messages using the first client system's public network address and also sends outgoing local address test messages if the local network address is compatible with the external network. The second client system continues to send test messages to the first client system until the second client system receives a confirmation message from the first client system in block 730, as described below. The NAT device connected to the second client system records the destination addresses for the outgoing test messages as "approved" addresses, block 710. As described above, the first client system is also sending test messages to the second client system and the second client system receives a test message from the first client system, block 715. The second client system records the origin address of the received test message, block 720, and sends a confirmation message to the first client system using the origin message, block 725. As described above, the first client system also sends a confirmation message to the second client system after receiving a test message from the second client system and the second client system receives the confirmation message, block 730. When the second client system receives a confirmation message from the first client system, the second client system stops sending test messages to the first client system. The second client system has now established communication with the first client system.

Figure 8:
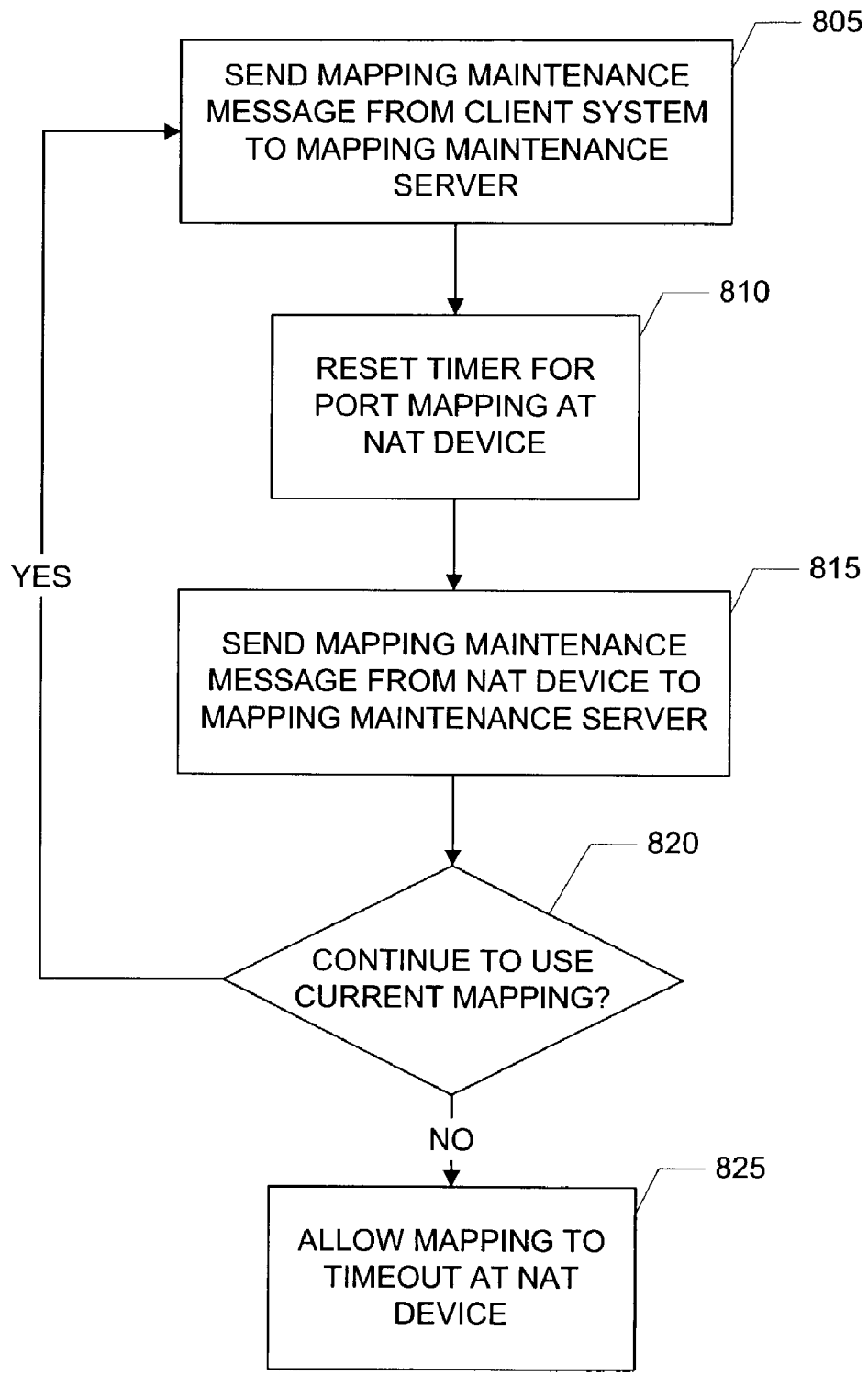
FIG. 8 is a flowchart of a client system maintaining the mapping assigned by a connected NAT device.

FIG. 8 is a flowchart of a client system maintaining the mapping assigned by a connected NAT device (recall block 315 of FIG. 3). A client system uses its network mapping maintenance manager component to manage maintaining the address mapping of a connected NAT device with the mapping maintenance server (recall network mapping maintenance manager 220 in FIG. 2). As described above, in one implementation, a NAT device assigns local network addresses to the systems on the local network of the NAT device. The NAT device also assigns port numbers for the public network address used by local systems. When a local system sends data to the external network, the NAT device assigns a port number to the local system and stores the port number. When the NAT device receives incoming data, the NAT device checks the port number in the target address for the incoming data (e.g., in the header information) to determine which local system is the intended recipient. As described above the NAT device also uses the port number to confirm that the sender of the incoming data is "approved" before forwarding the data to the local system. Once the NAT device has assigned a port number to a local system, the NAT device begins counting down a timer. If the local system sends more data to the external network, the NAT device uses the same port number and resets the timer. Similarly, if the NAT device receives incoming data using the port number, the NAT device resets the timer. If the timer reaches zero, the NAT device frees the port number (a "timeout") because the port number has not been used recently. To prevent this "timeout" a client system periodically sends mapping maintenance messages to the mapping maintenance server while the client system is communicating or attempting to communicate with another client system. As described above, in one implementation, the mapping maintenance server is included within the address server or the matching server and so the client system sends mapping maintenance messages to the appropriate server. In one implementation not including a mapping maintenance server, the client system does not send mapping maintenance messages.

The client system sends a mapping maintenance message to the mapping maintenance server through the connected NAT device, block 805. Referring to FIG. 1, the first client system 105 sends a mapping maintenance message through the first NAT device 110 to the mapping maintenance server 150. The NAT device receives the mapping maintenance message and resets the timer for the port number assigned to the client system, block 810. The NAT device sends the mapping maintenance message to the mapping maintenance server, block 815. After a predetermined period, the client system evaluates whether to maintain the current address, block 820. If the client system is communicating with another client system or attempting to communicate with another client system, the client system sends another mapping maintenance to the mapping maintenance server to preserve the current port mapping, returning to block 805. If the client system is done communicating, the client system does not send another mapping maintenance message and allows the port mapping to timeout, block 825. In one implementation, the mapping maintenance server does not respond to the client system. Alternatively, the mapping maintenance server sends a mapping maintenance confirmation message to the client system.

Figure 9A:
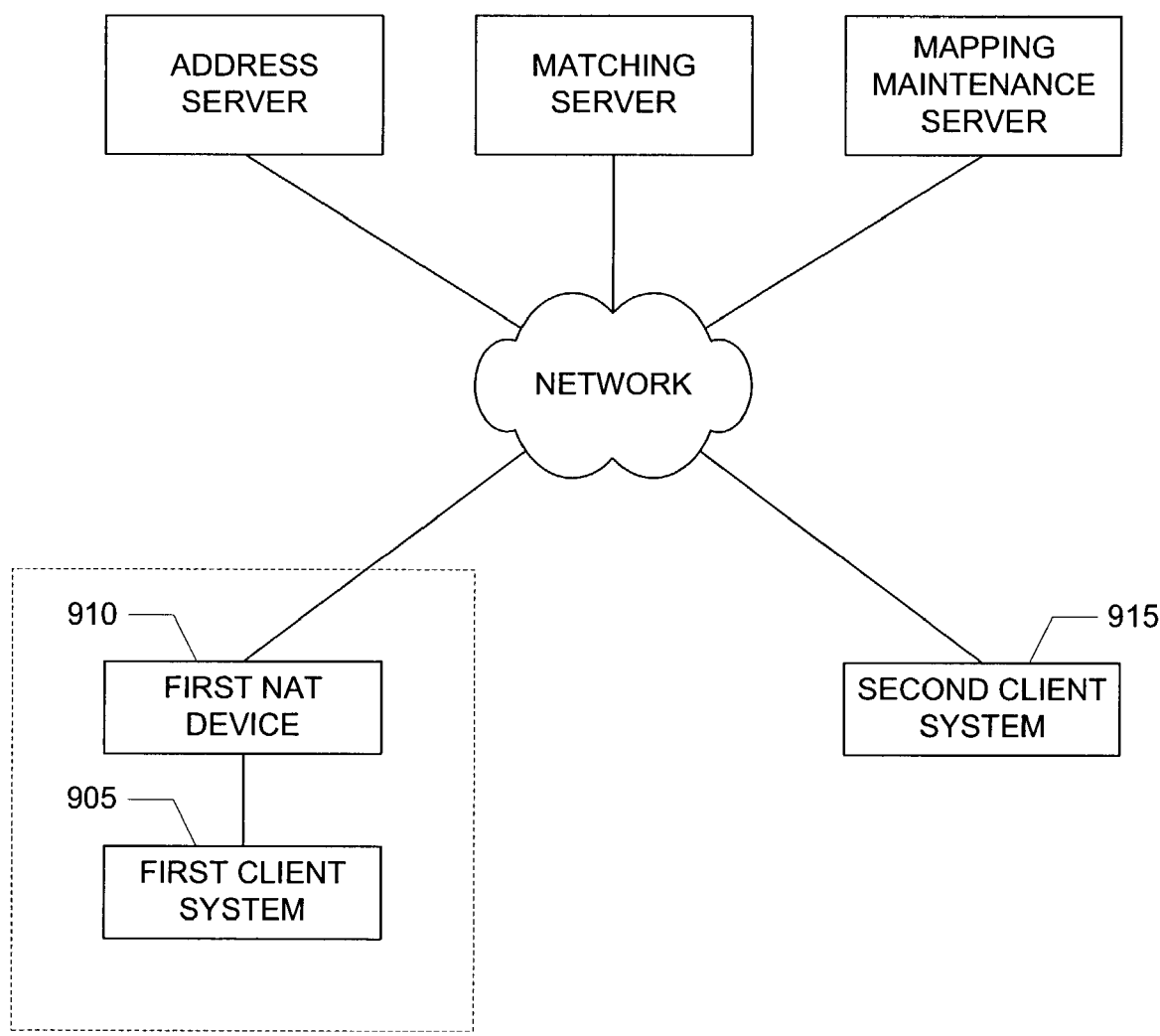
FIGS. 9A-9C show alternative network configurations.
Figure 9B:
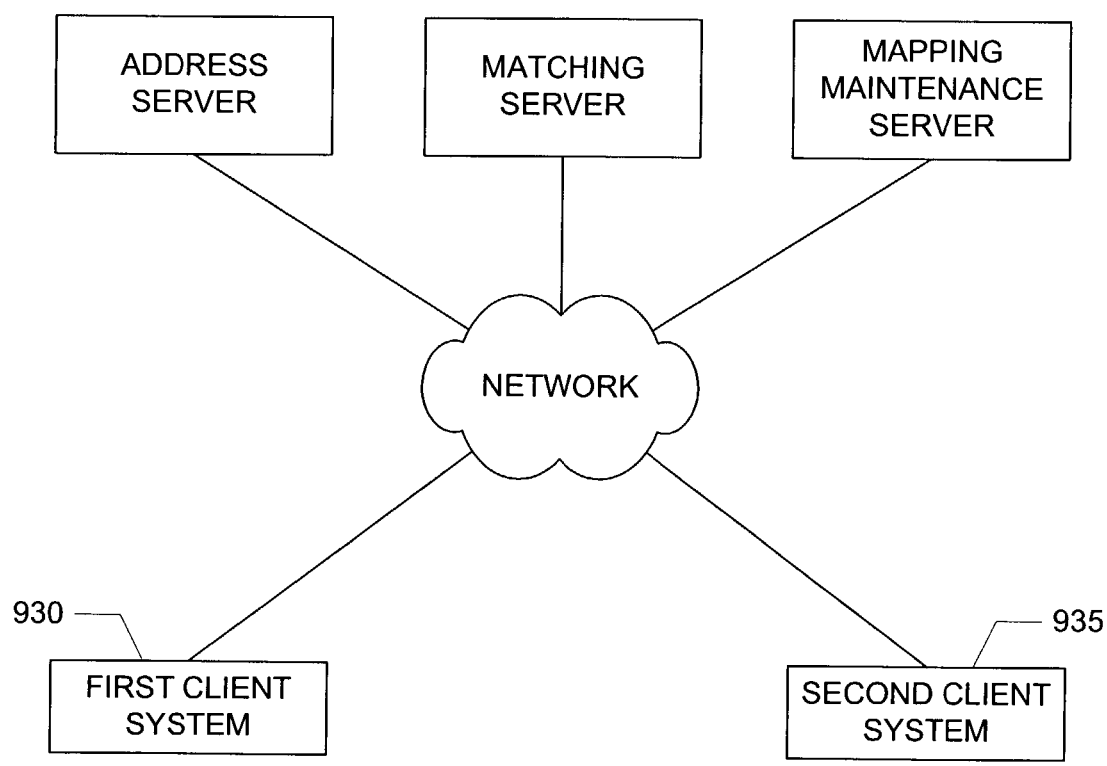
Figure 9C:
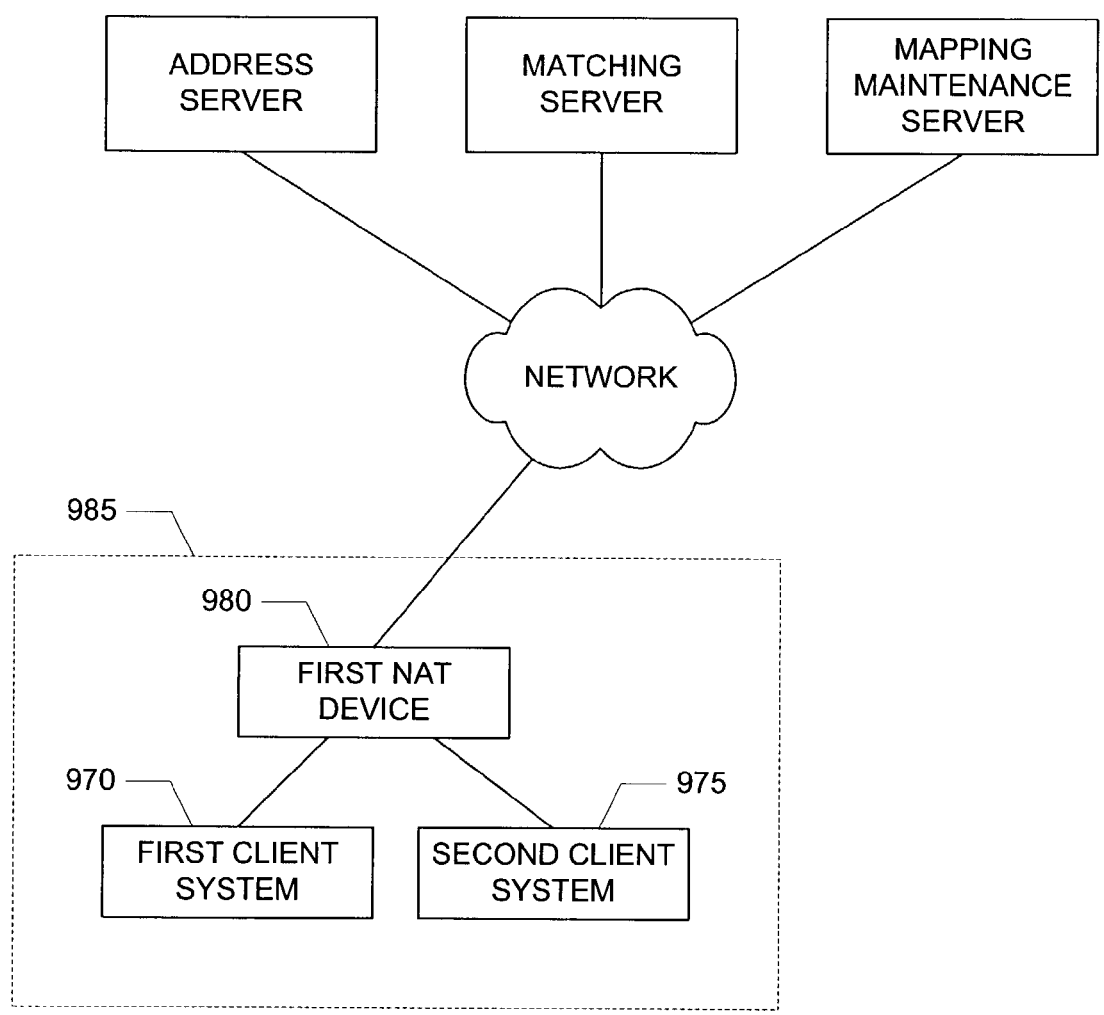

While the description above focuses on a network configuration where two client systems are behind respective NAT devices (recall FIG. 1), the operation of the two client systems and the server systems are independent of the presence of NAT devices. FIGS. 9A-9C show alternative network configurations. In FIG. 9A, a first client system 905 is behind a NAT device 910 while a second client system 915 is not connected to a NAT device. In FIG. 9B, both client systems 930, 935 are not connected to NAT devices. In FIG. 9C, both client systems 970, 975 are behind the same NAT device 980 in the same local network 985. In each of these alternative configurations, as well as other variations, the client systems and server systems can interact in substantially the same way as described above.

Section 2—Network Evaluation

This section describes evaluating network configurations.

A configuration server analyzes address information received from a client system to evaluate the network connected to the client system. In one implementation, the configuration server determines whether or not there is a NAT device between the client system and the configuration server. In alternative implementations, the configuration server also evaluates other information, such as what type of NAT device is present or information about other systems in the client system's local network.

As described above, when a client system is connected to an external network through a NAT device, the client system has a local network address and a public network address. These two addresses are typically different. In one implementation, a local or public network address includes an address number and a port number. The local network address is the network address of the client system in a local network formed by the NAT device and the client system (and possibly additional systems). The local network address is assigned to the client system by the NAT device. The public network address is the network address on the external network shared by the NAT device among the systems in the local network connected to the NAT device. In another implementation, the NAT device has a pool of public network addresses to share among local systems.

When a client system connected to the external network through a NAT device sends a message to the external network, the NAT device modifies the message before sending the message out to the external network. The client system includes the local network address in the message, such as in header information indicating the source address of the message. As part of the NAT device's network address translation functionality, the NAT device adds the public network address to the address message, such as by replacing the local network address in the header with the public network address. When using port numbers, if the NAT device has not already assigned a port number to the client system, the NAT device assigns a port number and includes the port number in the public network address in the address message (e.g., in the UDP header).

When a client system is connected to an external network without passing through a NAT device, the client system's local network address and public network address are the same. Without a NAT device, the network address used by the client system within the local network is the same network address used by the client system in the external network. When a client system connected to the external network without passing through a NAT device sends a message to the external network, the header information indicating the source address of the message does not change from what the client system set the source address to.

Accordingly, a configuration server uses address information received from a client system to evaluate the client system's network. As described below, in one implementation, the configuration server receives the local network address and the public network address of a client system and then evaluates the addresses to determine or estimate whether a NAT device is present or not, including comparing the addresses. The configuration server stores the addresses and the address evaluation for various purposes, such as for marketing information or for technical support.

Figure 10:
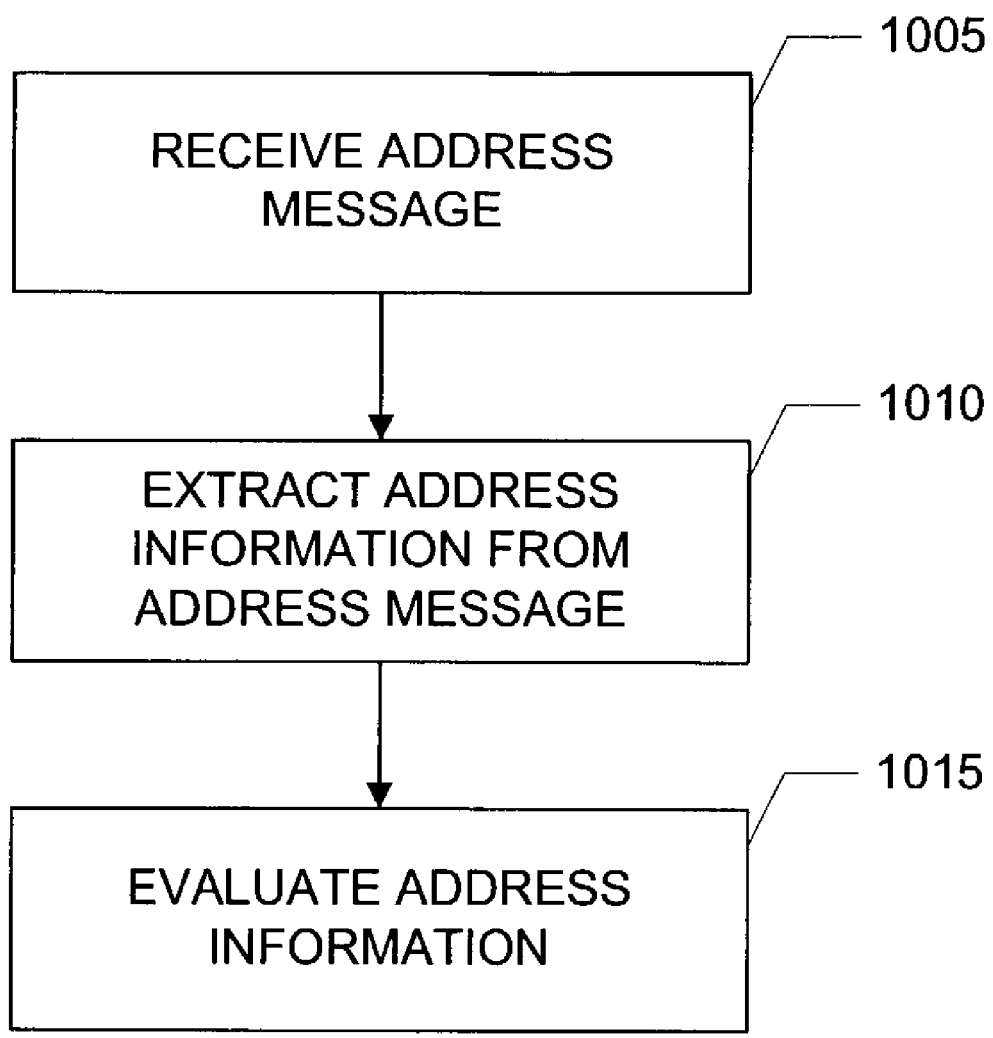
FIG. 10 is a flowchart of a configuration server evaluating the network configuration for a client system.

FIG. 10 is a flowchart of a configuration server evaluating the network configuration for a client system. FIG. 10 focuses on the configuration server. Initially, in one implementation, the configuration server receives an address message from a client system, block 1005. The address message includes address information from the client system, such as the client system's local network address and public network address. In another implementation, the configuration server sends a request to the client system for an address message (e.g., after establishing communication with the client system) and the client system sends the address message to the configuration server in response to the request. The configuration server extracts the address information from the address message and stores the address information, block 1010. The configuration server evaluates the extracted address information. block 1015. The configuration server uses the address information to determine characteristics of the client system's network configuration. For example, as described below, when the local network address and public network address extracted from the address message are different, the configuration server determines that the message from the client system passed through a NAT device. In another example, by collecting information from multiple client systems about how many client systems are connected to NAT devices, the configuration server builds information about NAT device use, such as for marketing. Multiple configuration servers can also share information or provide their information and evaluations to a common location or organization, such as an evaluation server for collecting and evaluating evaluation information for multiple client systems. In another implementation, the configuration server sends evaluation information back to the client system.

In an alternative implementation, the client system sends local network information to the configuration server in addition to or instead of the address messages. The local network information includes information about the local network of the client system. For example, the client system collects information about other systems connected to the local network, such as how many or what types of systems are connected to the local network (e.g., using broadcast messaging, inspecting network "cookies," using system administration tools). In one implementation, the local network information includes one or more network cookies from the client system. In another implementation, the local network information includes information collected by the client system by querying the other local systems or the NAT device such as by using requests according to a protocol such as UPnP (universal plug and play). The configuration server can also use the local network information in evaluating the client system's network configuration and operation.

Figure 11:
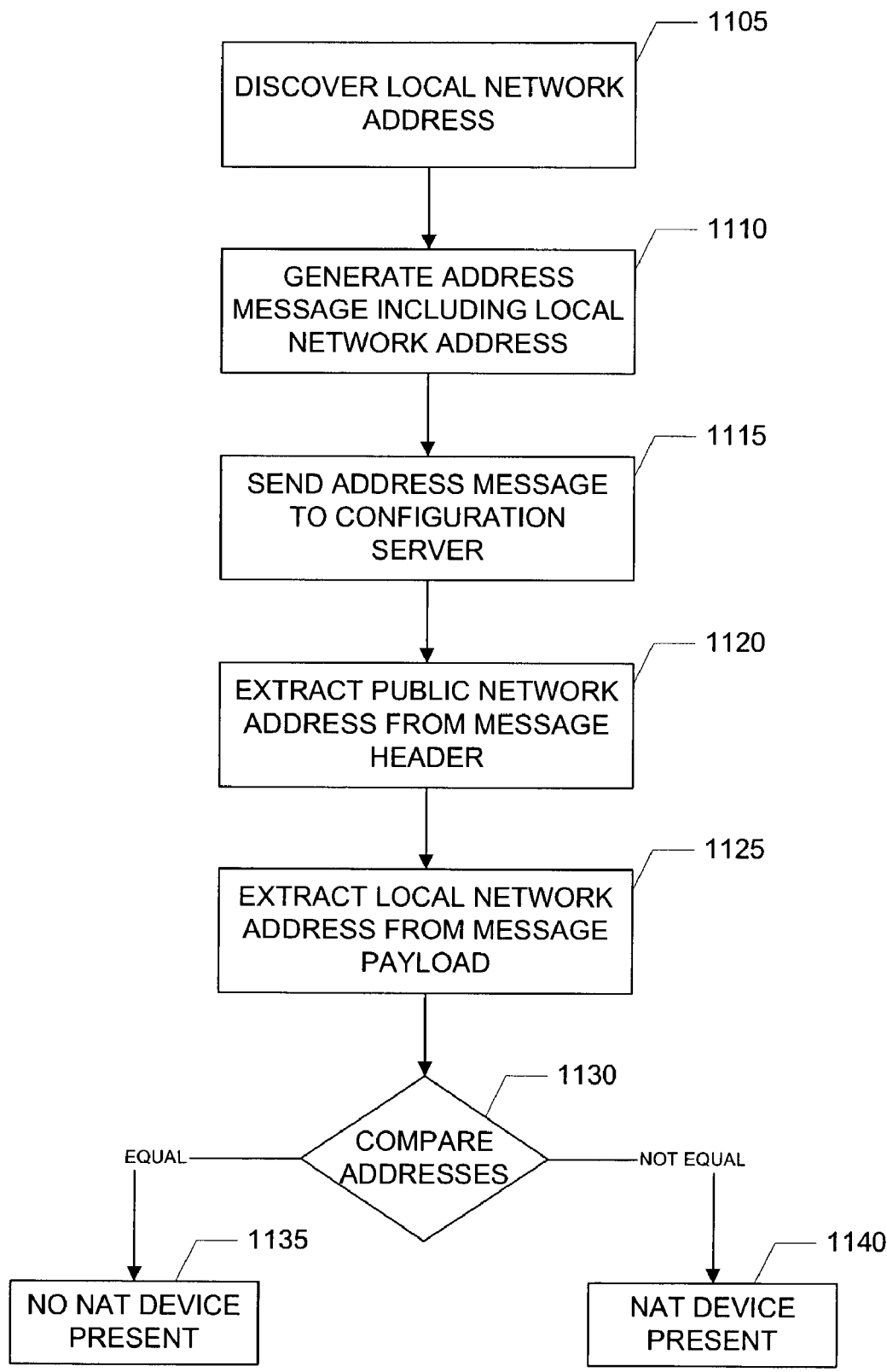
FIG. 11 is a flowchart of evaluating the network configuration for a client system by comparing local and public network addresses.

FIG. 11 is a flowchart of one implementation of evaluating the network configuration for a client system by comparing local and public network addresses. FIG. 11 provides a view of operations throughout the system. Initially, the client system discovers its local network address, block 1105. In one implementation, a client system discovers its local network address by accessing local storage, such as by querying the network stack software used by the client system. The client system establishes the local port number when the client system initiates communication with a NAT device or other network gateway and so the client system is already aware of the port number. Alternatively, the client system can request the local network address. As discussed above, the local network address may be the same as the public network address, such as when there is no NAT device present.

The client system generates an address message including the local network address of the client system, block 1110. The client system stores the local network address in the data or payload portion of the address message. In one implementation, the client system also includes additional information identifying the client system, such as a serial number or a MAC address.

The client system sends the address message to the configuration server through the external network, block 1115. When the client system is connected to the external network through a NAT device, the NAT device modifies the address message before sending the address message out to the external network. As part of the NAT device's network address translation functionality, the NAT device adds the public network address to the address message, such as in header information indicating the source address of the address message. If the NAT device has not already assigned a port number to the client system, the NAT device assigns a port number and includes the port number in the public network address in the address message (e.g., in the UDP header).

The configuration server extracts the public network address from the address message and stores the public network address, block 1120. The public network address is located within the address message at a known location (e.g., within the header) so the configuration server can find the public network address in the address message. In one implementation, the configuration server extracts the source address of the address message and stores this source address as the public network address for the client system. In an alternative implementation, the configuration server does not store the public network address or only stores the public network address temporarily.

The configuration server extracts the local network address from the address message and stores the local network address, block 1125. The local network address is located within the address message at a known location (e.g., within the payload) so the configuration server can find the local network address in the address message. In an alternative implementation, the configuration server does not store the local network address or only stores the local network address temporarily.

The configuration server compares the extracted addresses, block 1130. As discussed above, a NAT device between the client system and the configuration server sets the source address of an outgoing message from the client system to the public network address of the NAT device. In this case, the public network address is different from the local network address. Accordingly, if the public network address and the local network address are the same, the configuration server determines that there is no NAT device present between the client system and the configuration server, block 1135. If the public network address and the local network address are not the same, the configuration server determines that there is a NAT device present between the client system and the configuration server, block 1140. However, the evaluation is not necessarily determinative and may only provide a guideline or estimate. For example, under some circumstances some NAT devices provide a public network address to a client system as a local network address and so the local network address and public network address for a client will be the same even though there is an intervening NAT device (e.g., in some implementations of a "demilitarized zone" or "DMZ" in a NAT device).

By determining whether the client system is connected to the external network through a NAT device, the configuration server can gather information from multiple client systems to evaluate the number of NAT devices being used by client systems. This information can provide valuable marketing insights related to NAT device penetration among the client systems. For example, NAT device penetration can be indicative of router use (e.g., because routers often provide NAT functionality in home networks), local network penetration (e.g., NAT device presence often indicates a local network of more than one device or system has been established), broadband penetration (e.g., NAT devices may be more commonly used with broadband connections, such as ISDN, cable modems, DSL modems, etc.). Furthermore, categorizing a particular client system as being connected to a NAT device or not can provide useful marketing information as well. For example, a user of a client system connected to a NAT device may be a desirable target in targeted marketing, such as for home networking products or services. Similarly, a user without a NAT device may be a desirable target for advertising a NAT device.

In alternative implementations, the configuration server performs additional evaluation of the address information. In other implementations, the configuration server evaluates additional information or combinations of information about the client system's network configuration, such as the local network information described above.

In one implementation, if the configuration server determines a NAT device is present, the configuration server estimates what type of NAT device is being used. Because the NAT device assigns the local network address to the client system, the local network address provides information about the NAT device. The address allocation pattern shows device type information. For example, some manufacturers, brands, or models of NAT devices may use unique local network addresses. Accordingly, the configuration server includes a NAT device table of addresses used as local network addresses of one or more NAT device manufacturers (or brands, models, etc.). The configuration server compares the local network address with the table entries to determine if the NAT device matches one of the entries. For example, one NAT device table indicates that a NAT device made by manufacturer A uses an IP address of 192.168.0.x for local network addresses (where 192, 168, and 0 are fixed values and "x" indicates a free value in the addresses used) while manufacturer B uses an IP address of 192.168.128.x. The address allocation patterns may also apply to public network addresses and port mappings. In addition to brand, the address allocation can also show model of NAT device or the version of firmware being run by the NAT device. The device type information may also provide insight into types of broadband use (e.g., DSL versus cable modems) according to the compatibility of the brand or model.

Another use for the device type information is for technical support. For example, a technical support server includes a configuration server and has collected device type information for a client system. When a user of the client system contacts technical support, the technical support server already has an estimate of what type of NAT device is connected to the client system.

In another implementation, the configuration server evaluates the number of local systems connected to the client system's NAT device (though this may not be determinative). In one approach, the configuration server analyzes the public network address or the local network address and estimates how many other devices may be using the same NAT device. For example, when a client system's local network address is 192.168.1.5, the configuration server estimates that the client system is the sixth system or device connected to the NAT device, as local network addresses 192.168.1.0 through 192.168.1.4 appear to have been allocated elsewhere. In a similar example, when a client system's public network address ends with 0.3, the configuration server estimates that the NAT device has used the fourth public network address of a pool of public network addresses for the client system and so four other systems or devices are connected to the NAT device. A configuration server can evaluate port numbers in addresses in a similar way.

In one implementation of the network architecture 100 shown in FIG. 1, the address server 140 described above in Section 1 referring to FIG. 1 is also or includes a configuration server as described in Section 2. This address-configuration server 140 includes components, such as additional hardware, software, or a combination of both, to evaluate the network configuration of the first local network 115 or the second local network 135. For example, the address request from the first client system 105 also serves as an address message for the address server 140, and the address server 140 evaluates the network configuration of the first local network 115, as described above.

Figure 12:
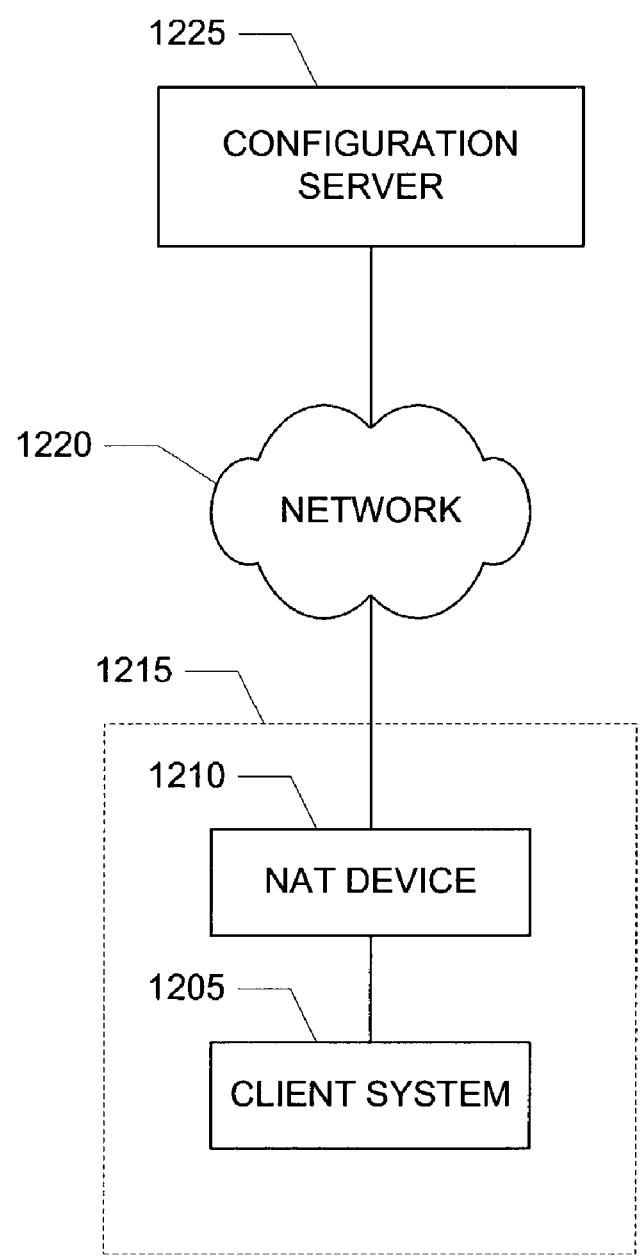
FIG. 12 shows a network system including a configuration server.

FIG. 12 shows another implementation of a network system 1200 including a configuration server. This network architecture 1200 is similar to the network architecture 100 described above referring to FIG. 1, however, the only server is a configuration server 1225. A client system 1205 is connected to a NAT device 1210, forming a local network 1215. The client system 1205 in the local network 1215 has a local network address assigned and maintained by the NAT device 1210. The NAT device 1210 is connected to an external or public network 1220, such as the Internet, and has a public network address. A configuration server 1225 is also connected to the external network 1220. The configuration server 1225 operates as described above referring to FIGS. 10 and 11. Accordingly, the client system 1205 and the configuration server 1225 communicate through the external network 1220 and the NAT device 1210 and the configuration server 1225 evaluates the configuration of the local network 1215 using address information received from the client system 1205. In one implementation, the configuration server 1225 is a network system (e.g., including a computer and performing additional operations beyond network configuration evaluation), while in another implementation, the configuration server 1225 is a special-purpose network device.

Some NAT devices are destination dependent NAT devices and map a different public network address to a client system for each different destination of data from a client system. For example, a destination dependent NAT device has a pool of public network addresses (or a pool of port numbers). When a client system connected to the destination dependent NAT device sends a message to a first destination on the external network, the destination dependent NAT device assigns a first public network address to the client system and uses that first public network address in communicating between the client system and the first destination. When the client system sends a message to a second destination (having a different public network address than that of the first destination), the destination dependent NAT device assigns a second public network address to the client system and uses that second public network address in communicating between the client system and the second destination. It can be useful to recognize that a NAT device is a destination dependent NAT address, such as for marketing or technical support as described above, or for compatibility with functions or software of the client system or another server.

Figure 13:
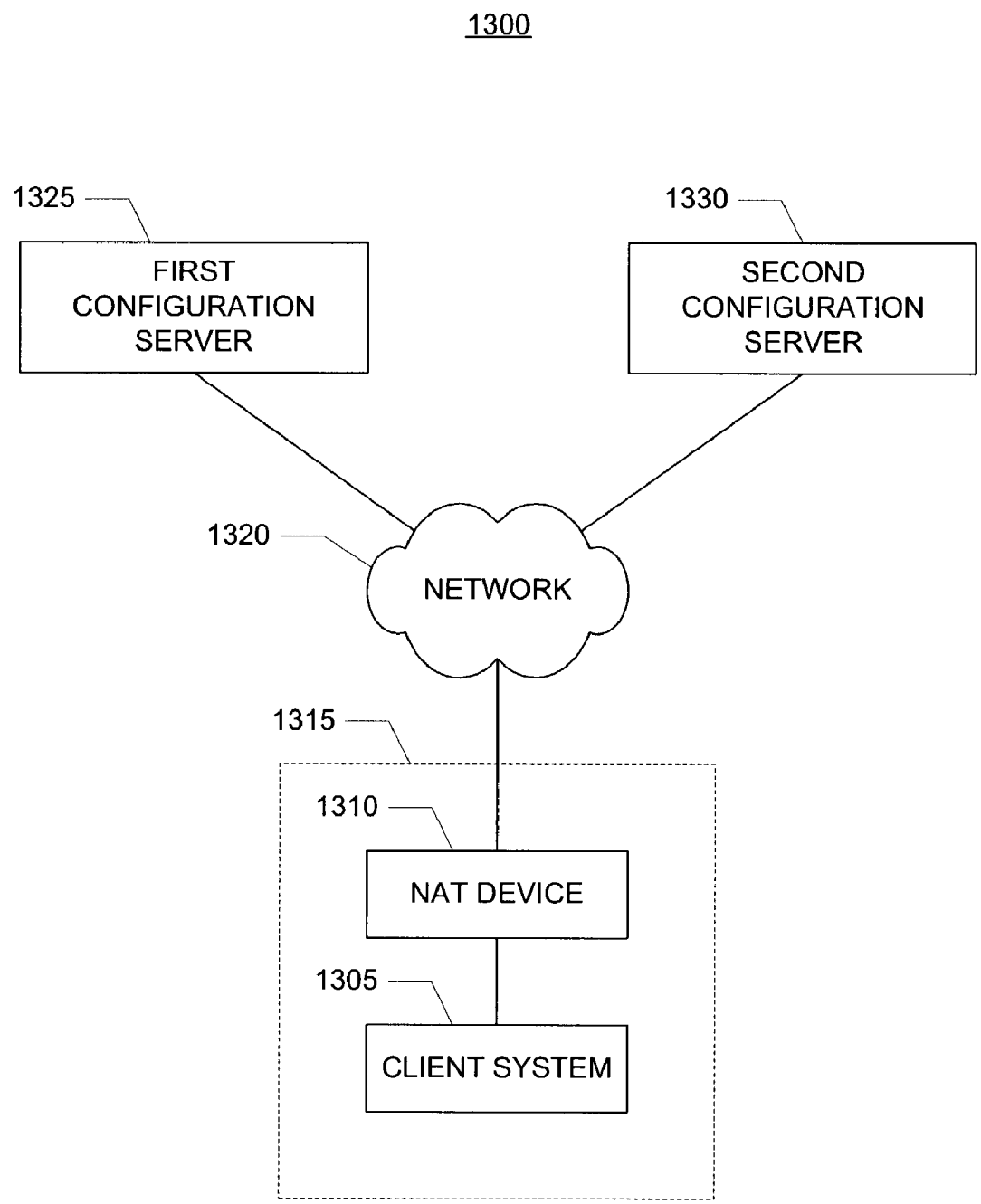
FIG. 13 shows a network system including two configuration servers.

FIG. 13 shows another implementation of a network system 1300 including two configuration servers. This network architecture 1300 is similar in structure to the network architecture 1200 described above referring to FIG. 12, however, two configuration servers 1325 and 1330 are connected to the external network 1320. A client system 1305 is connected to a NAT device 1310, forming a local network 1315. The client system 1305 in the local network 1315 has a local network address assigned and maintained by the NAT device 1310. The NAT device 1310 is connected to an external or public network 1320, such as the Internet, and has at least one public network address. A first configuration server 1325 and a second configuration server 1330 are also connected to the external network 1320. The first configuration server 1325 and the second configuration server 1330 each have a respective public network address. In an alternative implementation, the two configuration servers 1325, 1330 are part of the same server (e.g., as separate components or subsystems), but the one configuration server then has two public network addresses. Generally, the client system 1305 and the configuration servers 1325, 1330 communicate through the external network 1320 and the NAT device 1310. The configuration servers 1325, 1330 evaluate the configuration of the local network 1315 using address information received from the client system 1305, including determining whether the NAT device 1310 is a destination dependent NAT device 1310.

Figure 14:
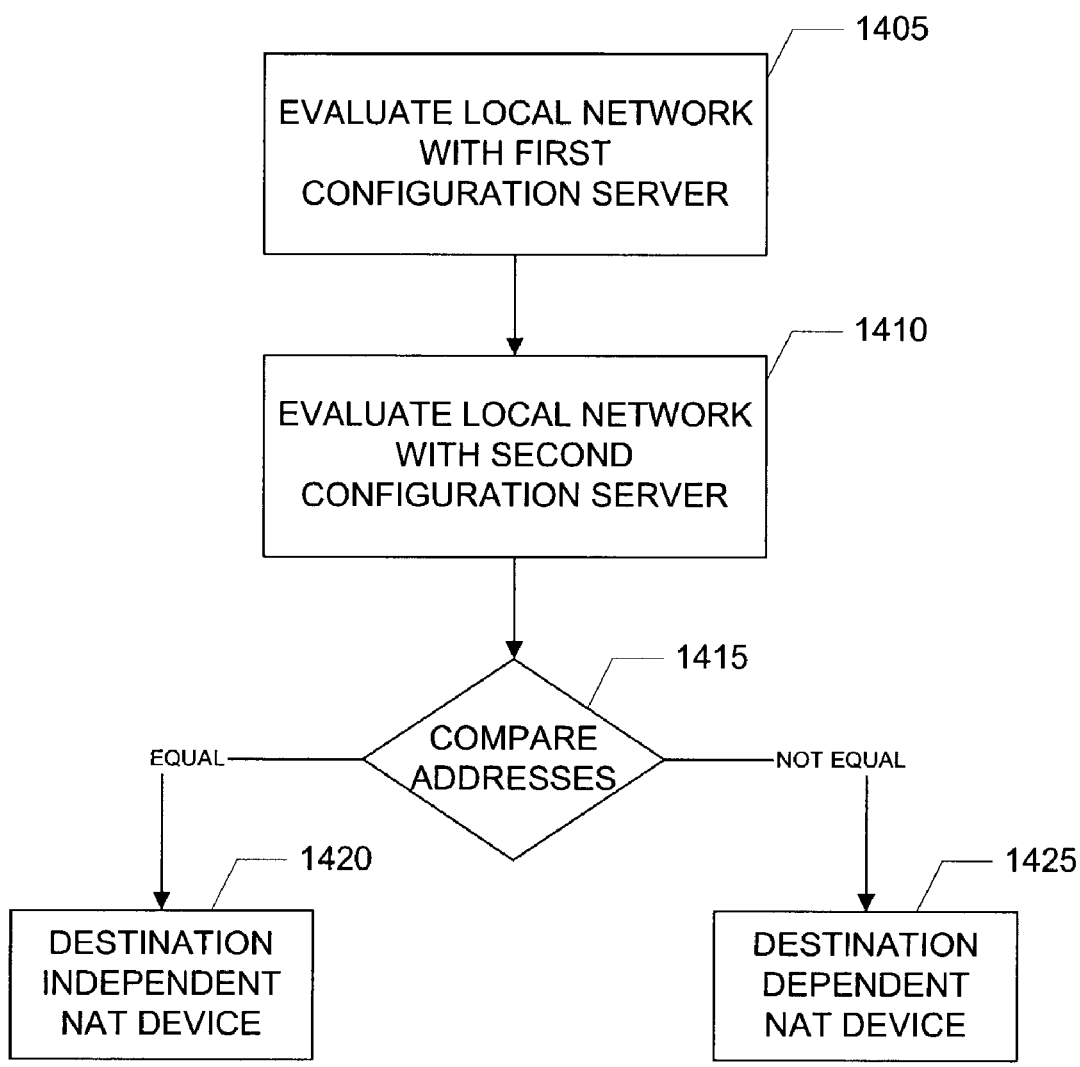
FIG. 14 is a flowchart of using two configuration servers in evaluating whether a NAT device is a destination dependent NAT device.

FIG. 14 is a flowchart of using two configuration servers in evaluating whether a NAT device is a destination dependent NAT device, such as using the configuration servers 1325, 1330 described above referring to FIG. 13. The first configuration server evaluates the local network of the client system, block 1405. The first configuration server evaluates the local network of the client system as described above referring to FIGS. 10 and 11. For example, the configuration server receives local and public network addresses from a client system and determines whether a NAT device is present. The second configuration server evaluates the local network of the client system, block 1410. The second configuration server performs its evaluation before or after the first configuration server, or in parallel. At this point, both of the configuration servers have received a public network address from the client system. If a NAT device is present, the configuration servers compare the public network addresses received, block 1415. One of the configuration servers sends the received public network address to the other configuration server over the external network. In another implementation, the configuration servers are directly connected or connected in a local or private network. For example, referring to FIG. 13, the first configuration server 1325 sends the public network address received from the client system 1305 to the second configuration server 1330 through the external network 1320. The second configuration server 1330 compares the public network address received from the first configuration server 1325 with the public network address received by the second configuration server 1330 from the client system 1305.

If the NAT device is a destination dependent NAT device, when the client system sends an address message to the different configuration servers, the destination dependent NAT device inserts a different public network address in the outgoing address messages. If the NAT device is not a destination dependent NAT device (i.e., it is a "destination independent" NAT device), the NAT device uses the same public network address for the client system's outgoing messages, including the address messages to the different configuration servers.

Therefore, when the configuration servers compare the received public network addresses, if the two public network addresses are the same, then the NAT device is not a destination dependent NAT device, block 1420. If the two public network addresses are different, then the NAT device is a destination dependent NAT device, block 1425. One or both of the configuration servers stores the result of the evaluation of the NAT device. As described above, the result and the pattern of public network address allocation in a destination dependent NAT device can be used for marketing and to predict or estimate aspects of the NAT device, such as brand or model. Again, the evaluation is not always determinative as many types of NAT devices are available.

In another implementation, a configuration server receives regular address messages from a client system to evaluate if a connected NAT device is changing the mapping of the client system. As discussed above, some NAT devices may "time out" a mapping after a period and assign a different public network address to a client system. By periodically comparing a stored public network address (e.g., received in a first address message from the client system) with public network addresses received in regular address messages, the configuration server can evaluate if the public network address assigned to the client system by the NAT device has changed or how often the mapping changes. The configuration server can also use this evaluation to estimate the type of the NAT device (e.g., certain models do not change mappings, while others change mappings at known periods, or have known "time out" periods).

The various implementations of the invention are realized in electronic hardware, computer software, or combinations of these technologies. Most implementations include one or more computer programs executed by a programmable computer. For example, referring to FIG. 12, in one implementation, the client system 1205 and the configuration server system 1225 each include one or more programmable computers implementing the respective aspects of the network system described above. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. Accordingly, the present invention is not limited to only those implementations described above.

What is claimed is:

1. A method of evaluating a network configuration, comprising:

receiving an address message at a configuration server from a client system through a network, where the address message includes first address information and second address information for the client system;

extracting the first address information and the second address information from the address message at the configuration server;

evaluating the first address information and the second address information at the configuration server including comparing the first address information and the second address information; and determining whether the client system is connected to the network through a NAT device based on a result of the comparison in said evaluating step, wherein the first address information is a local network address and the second address information is a public network address, and wherein evaluating the first address information and the second address information further includes comparing the first address information to a table of address information to evaluate through what type of NAT device the client system is connected to the network.

2. The method of claim 1, where the first address information is in the payload portion of the address message and the second address information is in the header portion of the address message.

3. The method of claim 1, where the first address information includes a first address number and a first port number, and the second address information includes a second address number and a second port number.

4. The method of claim 1, where if the first address information and the second address information are different the determination is that the client system is connected to the network through a NAT device.

5. The method of claim 1, where evaluating the type of the NAT device includes estimating the manufacturer of the NAT device.

6. The method of claim 1, where evaluating the type of the NAT device includes estimating the model of the NAT device.

7. The method of claim 1, where evaluating the type of the NAT device includes estimating the version of firmware used by the NAT device.

8. The method of claim 1, further comprising evaluating the first address information to determine how many systems are included in a local network including the client system.

9. The method of claim 1, further comprising collecting address information from multiple client systems at the configuration server and evaluating one or more patterns in the network configurations of the multiple client systems.

10. The method of claim 1, further comprising sending the evaluation from the configuration server to an evaluation server through the network.

11. The method of claim 1, further comprising:

discovering a local network address of the client system at the client system;

generating the address message at the client system including the local network address as the first address information;

sending the address message from the client system to the configuration server, including a public network address as the second address information;

estimating that the client system is connected to the network through a NAT device if the first address information and the second address information are different; and estimating that the client system is not connected to the network through a NAT device if the first address information and the second address information are the same.

12. The method of claim 1, further comprising:
receiving a second address message at a second configuration server from the client system through the network, where the second address message includes the first address information and third address information for the client system;
extracting the first address information and the third address information from the second address message at the second configuration server;
evaluating the first address information and the third address information at the second configuration server including comparing the first address information and the third address information;
sending the second address information to the second configuration server; and
comparing the second address information and the third address information at the second configuration server to determine if the client system is connected to the network through a destination dependent NAT device.

13. The method of claim 1, further comprising:
storing the second address information at the configuration server;
periodically receiving new address messages at the configuration server from the client system through the network, where each new address message includes new second address information;
extracting the new address information from each new address message; and
comparing the new second address information to the stored second address information to determine if the second address information is changing.

14. The method of claim 1, further comprising receiving local network information at the configuration server from the client system, where the local network information includes information about a local network including the client system.

15. The method of claim 14, where the local network information includes information indicating the number of systems in the local network.

16. The method of claim 14, where the local network information includes information collected using UPnP.

17. The method of claim 1, further comprising:
discovering a first network address for the client system, where the client system is connected to a first NAT device and the first network address is included in the second address information;
discovering a second network address for a second client system connected to a second NAT device;
sharing the first network address with the second client system;
sharing the second network address with the first client system;
establishing communication between the first client system and the second client system using the first network address and the second network address.

18. A computer program, stored on a tangible storage medium, for use in evaluating a network configuration, the program comprising executable instructions that cause a computer to:
receive an address message from a client system through a network, where the address message includes first address information and second address information for the client system;
extract the first address information and the second address information from the address message;
evaluate the first address information and the second address information including comparing the first address information and the second address information; and
determine whether the client system is connected to the network through a NAT device based on a result of comparing the first address information and the second address information,
wherein the first address information is a local network address and the second address information is a public network address, and
wherein evaluating the first address information and the second address information further includes comparing the first address information to a table of address information to evaluate through what type of NAT device the client system is connected to the network.

19. The computer program of claim 18, where the first address information is in the payload portion of the address message and the second address information is in the header portion of the address message.

20. The computer program of claim 18, where the first address information includes a first address number and a first port number, and the second address information includes a second address number and a second port number.

21. The computer program of claim 18, where if the first address information and the second address information are different the determination is that the client system is connected to the network through a NAT device.

22. The computer program of claim 18, where evaluating the type of the NAT device includes estimating the manufacturer of the NAT device.

23. The computer program of claim 18, where evaluating the type of the NAT device includes estimating the model of the NAT device.

24. The computer program of claim 18, where evaluating the type of the NAT device includes estimating the version of firmware used by the NAT device.

25. The computer program of claim 18, further comprising executable instructions that cause a computer to evaluate the first address information to determine how many systems are included in a local network including the client system.

26. The computer program of claim 18, further comprising executable instructions that cause a computer to collect address information from multiple client systems at the configuration server and evaluate one or more patterns in the network configurations of the multiple client systems.

27. The computer program of claim 18, further comprising executable instructions that cause a computer to send the evaluation from the configuration server to an evaluation server through the network.

28. The computer program of claim 18, further comprising executable instructions that cause a computer to:
discover a local network address of the client system at the client system;
generate the address message at the client system including the local network address as the first address information;
send the address message from the client system to the configuration server, including a public network address as the second address information;
estimate that the client system is connected to the network through a NAT device if the first address information and the second address information are different; and estimate that the client system is not connected to the network through a NAT device if the first address information and the second address information are the same.

29. The computer program of claim 18, further comprising executable instructions that cause a computer to:
receive a second address message at a second configuration server from the client system through the network, where the second address message includes the first address information and third address information for the client system;
extract the first address information and the third address information from the second address message at the second configuration server;
evaluate the first address information and the third address information at the second configuration server including comparing the first address information and the third address information;
send the second address information to the second configuration server; and
compare the second address information and the third address information at the second configuration server to determine if the client system is connected to the network through a destination dependent NAT device.

30. The computer program of claim 18, further comprising executable instructions that cause a computer to:
store the second address information at the configuration server;
receive new address messages at the configuration server from the client system through the network, where each new address message includes new second address information;
extract the new address information from each new address message; and
compare the new second address information to the stored second address information to determine if the second address information is changing.

31. The computer program of claim 18, further comprising executable instructions that cause a computer to receive local network information at the configuration server from the client system, where the local network information includes information about a local network including the client system.

32. The computer program of claim 31, where the local network information includes information indicating the number of systems in the local network.

33. The computer program of claim 31, where the local network information includes information collected using UPnP.

34. The computer program of claim 18, further comprising executable instructions that cause a computer to:
discover a first network address for the client system, where the client system is connected to a first NAT device and the first network address is included in the second address information;
discover a second network address for a second client system connected to a second NAT device;
share the first network address with the second client system;
share the second network address with the first client system;
establish communication between the first client system and the second client system using the first network address and the second network address.

35. A configuration server, comprising:
means for receiving data from a client system through a network, including receiving an address message that includes first address information and second address information for the client system;
means for extracting the first address information and the second address information from the address message;
means for evaluating the first address information and the second address information including comparing the first address information and the second address information; and
means for determining whether the client system is connected to the network through a NAT device based on a result of comparing the first address information and the second address information,
wherein the first address information is a local network address and the second address information is a public network address, and
wherein evaluating the first address information and the second address information further includes comparing the first address information to a table of address information to evaluate through what type of NAT device the client system is connected to the network.

* * * * *